United States Patent [19]

Morel et al.

[11] Patent Number: 4,651,547
[45] Date of Patent: Mar. 24, 1987

[54] PROCESS FOR ADJUSTING THE THICKNESS AND PROFILE OF A FLAT PRODUCT IN THE COURSE OF ROLLING

[75] Inventors: Michel Morel, Chelles; Marc Valence, Courbevoie, both of France

[73] Assignee: Clecim, Courbevoie, France

[21] Appl. No.: 568,470

[22] Filed: Jan. 5, 1984

[30] Foreign Application Priority Data

Oct. 14, 1983 [FR] France ................................ 83 16341

[51] Int. Cl.[4] .................... B21B 29/00; B21B 37/12
[52] U.S. Cl. ............................ 72/8; 29/113 AD; 29/116 AD; 72/16; 72/17; 72/20; 72/243; 91/361; 100/162 B
[58] Field of Search ................ 72/8, 16, 17, 20, 243, 72/245, 20, 21; 29/116 AD, 113 AD, 113 R, 116 R; 100/162 B; 91/361, 363 R; 384/448, 99

[56] References Cited

U.S. PATENT DOCUMENTS

| | | | |
|---|---|---|---|
| 3,855,830 | 12/1974 | Kitanosono et al. | 72/8 |
| 4,030,177 | 6/1977 | Hold | 29/116 AD |
| 4,074,624 | 2/1978 | Biörnstad et al. | 72/243 X |
| 4,356,714 | 11/1982 | Quehen | 72/17 |
| 4,357,743 | 11/1982 | Hefter et al. | 29/113 AD X |
| 4,373,238 | 2/1983 | Güttinger | 29/113 AD X |
| 4,429,618 | 2/1984 | Klute et al. | 91/535 X |
| 4,464,921 | 8/1984 | Surat | 72/243 |

FOREIGN PATENT DOCUMENTS 0971648  7/1975  Canada ................................ 91/361

Primary Examiner—Lowell A. Larson
Assistant Examiner—Steve Katz
Attorney, Agent, or Firm—Pollock, Vande Sande & Priddy

[57] ABSTRACT

At an installation comprising a roll stand having at least one roll of the variable camber type, comprising a fixed support and a casing carried by at least three jacks and rotationally movable about the support, the pressure of the fluid in each of the jacks (14), the position of the pistons of these jacks, the speed of rotation of the roll, and the flatness and thickness of the flat product are measured. The position of one of the jacks (14b) is controlled by the thickness measurement. The pressure in the other jacks (14a, 14c, 14d, 14e) is controlled by the pressure in the one jack (14b). The positions of the end jacks (14a and 14e) are compared and the pressure in the jacks (14) is modified in order to bring the tilt of the roll to a suitable value. The deformation of the fixed support is calculated and the shape of the generatrix of contact of the roll is determined. The pressure in the jacks (14) is modified in order to bring the generatrix to a reference shape. The invention is particularly applicable to four-high rolling mills having variable camber supporting rolls.

8 Claims, 7 Drawing Figures

PROCESS FOR ADJUSTING THE THICKNESS AND PROFILE OF A FLAT PRODUCT IN THE COURSE OF ROLLING

FIELD OF THE INVENTION

The invention relates to a process for adjusting the thickness and profile of a flat product in the course of rolling, such as a metal sheet or strip in the course of conversion in a hot or cold rolling mill.

In order to achieve effective adjustment of the profile of a sheet in the course of rolling in a roll stand, the camber or curvature of the rolls of the stand can be modified depending on a measurement of the flatness of the sheet in its transverse direction.

In the case of a stand comprising more than two superposed rolls, for example a four-high stand comprising two supporting rolls and two work rolls, the camber or curvature of the supporting rolls or work rolls, or of both the supporting rolls and the work rolls, may be modified. The camber of a rolling mill roll can be modified by introducing a pressurized fluid into a space formed between the outer tubular casing of the roll and its support. However, the camber of a roll of this kind, which depends only on the pressure of the fluid, does not always permit the correction of faults in the transverse profile of the strip. These faults can be determined accurately by a flatness measuring device associated with the rolling mill. Such a device generally comprises a roller which is disposed transversely relative to the strip and which makes it possible to determine, for example, variations of tension in the strip, in the transverse direction. These transverse variations of the tension in the strip represent variations of the elongation and thickness of the strip.

BACKGROUND OF THE INVENTION

Variable camber rolling mill rolls have therefore been proposed, which permit adaptation of the camber to the thickness fault measured in the transverse direction of the strip. Rolls of this kind comprise a fixed support bearing on the frame of the roll stand and a tubular casing mounted for rotation about the fixed support, in such a manner that a space is formed between the fixed support and the inner surface of the tubular casing. The forces applied to the roll during rolling are taken up by means of jacks, whose chambers are fastened to the fixed support and whose pistons, directed radially relative to the rolls, have, at their ends directed towards the inner surface of the casing, a chamber receiving the pressurized fluid feeding the jack. Between the piston of each jack and the inner surface of the casing a film of fluid under pressure is thus formed, constituting a bearing on which the tubular casing rests.

The jacks are aligned in the axial direction of the roll, corresponding to the transverse direction of the sheet, and are regularly spaced in that direction. These jacks can be independently fed with pressurized fluid, thus making it possible to control the camber of the roll, along the length of the roll, extremely accurately.

This control of the camber is achieved by adjusting the pressure of the fluid in the different jacks in accordance with the readings of thickness gauges distributed in the transverse direction of the sheet at the outlet of the roll stand.

A process of this kind, which is described, for example, in French Pat. No. 2,360,713, nevertheless does not achieve great accuracy with regard to the adjustment of thickness, or sufficient stability in the course of the adjustment, because the deformations of the casing by the different jacks interfere with one another. Full use is therefore not made of the advantages which should be provided by an accurate camber adjusting device.

SUMMARY OF THE INVENTION

The object of the invention is therefore to propose a process for adjusting the thickness and profile of a flat product in the course of rolling in a roll stand comprising at least one roll consisting of a fixed support bearing on the frame of the roll stand and a tubular casing in contact with the flat product and/or with another roll, along a generatrix of contact, and mounted for rotation about the fixed support, the inside diameter of the casing being such that a space is formed between the support and the casing, which is held against the rolling forces by at least three jacks spaced apart in the axial direction of the roll, corresponding to the transverse direction of the flat product, each jack comprising a chamber fastened to the fixed support and a radially directed piston constituting, at its end directed towards the inner surface of the casing of the roll, at least one chamber receiving the pressurized fluid of the jack, in order to form a film of oil permitting the rotation of the casing by sliding on this film, which adjustment process should make it possible to obtain a flat product having a thickness which is constant in the course of time and uniform in the transverse direction, with great stability of operation.

To this end, continuously during the rolling of the flat product:

the pressure of the fluid is measured in each of the jacks, the position of the pistons is measured in each of the jacks, the speed of rotation of the roll is measured, the flatness of the flat product is measured in the transverse direction, the thickness of the flat product is measured in a zone situated transversely at a certain distance from the edges of the flat product, the position of the rod of the jack situated nearest to the thickness measuring zone is made dependent on the thickness measurement, the pressure of the fluid in the other jacks is made dependent on the pressure of the jack whose position is thus controlled, the positions of the two jacks situated in end transverse positions are compared in order to determine the tilt of the roll, the pressure in the jacks is modified so as to bring the tilt to a reference value determined by the transverse flatness measurement, the deformation of the fixed support is calculated from the pressures measured in each of the jacks and the mechanical and dimensional characteristics of the fixed support, the shape of the generatrix of contact of the roll is determined from the deformation of the fixed support and the position of the pistons of the jacks and, the pressure in the jacks is modified in order to make the shape of this generatrix of contact coincide with a reference shape determined from the transverse flatness measurement.

BRIEF DESCRIPTION OF THE DRAWINGS

In order to make the invention clearly understandable, a description will now be given of one application of the adjustment process according to the invention in the case of a four-high rolling mill in which one of the support cylinders is of the variable camber type.

DETAILED DESCRIPTION

Figure 1:
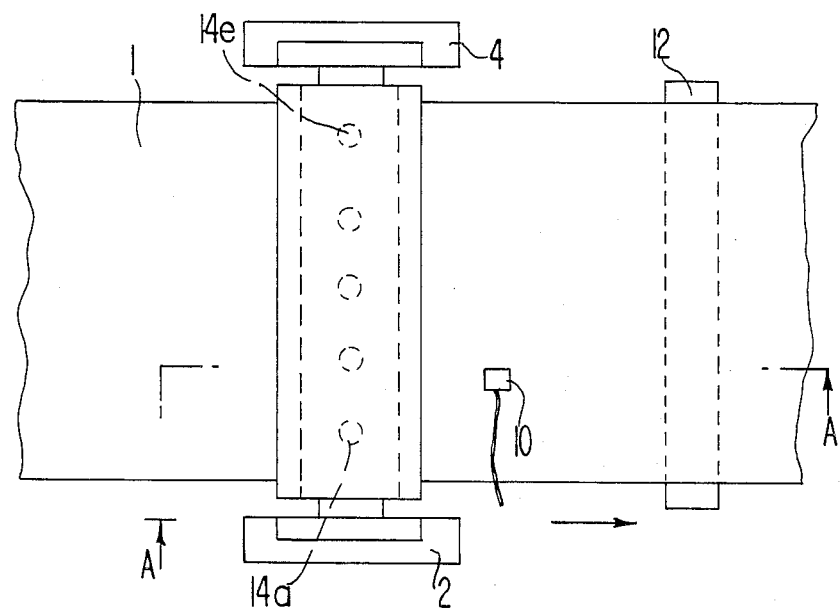
FIG. 1 is a diagrammatic plan view of the roll stand and of the measuring devices associated with it.
Figure 2:
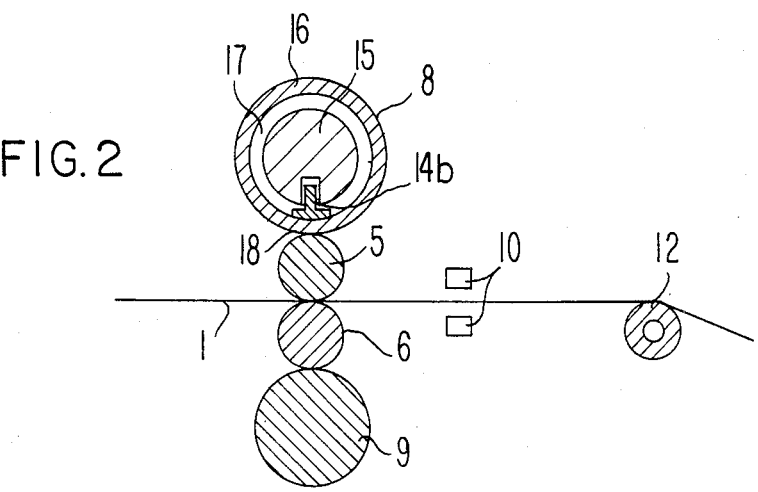
FIG. 2 is a sectional view along line A—A in FIG. 1.

FIGS. 1 and 2 show a metal strip 1 undergoing rolling in a roll stand 2 of the four-high type. This stand comprises two work rolls 5 and 6 and two supporting rolls 8 and 9 in a frame 4.

The supporting roll 8 is of the variable camber type and will be described in greater detail with reference to FIG. 3.

At the outlet of the stand is disposed a thickness measuring gauge 10, which continuously supplies a signal proportional to the thickness of the strip 1 at the outlet of the rolling mill.

The strip 1 then passes over a flatness roller 12, which may be of the type described in French Patent Application No. 2,468,878 of Société CLECIM in the case of the cold rolling of a metal strip. A flatness roller of this kind enables measurement of the tension in the strip over its width, i.e., in the axial direction of the flatness roller or of the rolls of the roll stand.

As can be seen in FIG. 2, the work rolls 5 and 6 and the supporting roll 9 of the roll stand are composed in the usual manner of solid rolls. On the other hand, the supporting roll 8 is of the variable camber type and comprises a cylindrical support 15 bearing against the frame 2 of the rolling mill, together with a tubular casing 16 whose internal diameter is such that an annular space 17 is left between the casing 16 and the support 15. This casing 16 is held bearing against the upper work roll 5 along a generatrix of contact 18 with the aid of five jacks 14 aligned and regularly spaced in the axial direction of the supporting roll 8, corresponding to the transverse direction of the strip 1 undergoing rolling.

Figure 3:
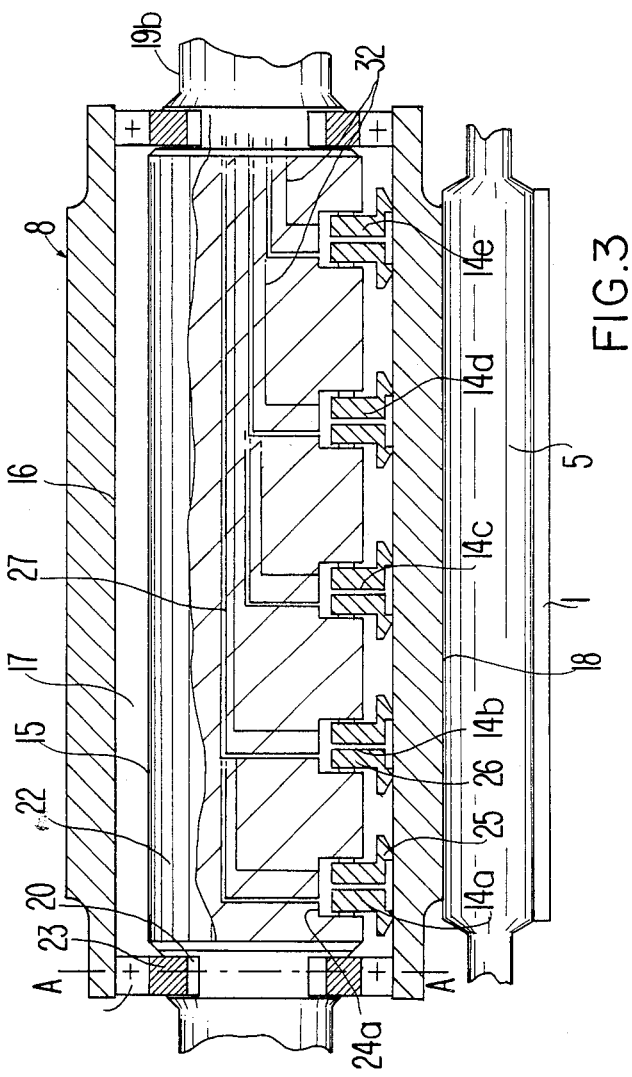
FIG. 3 is a sectional view, through its vertical plane of symmetry, of the variable camber support roll of the roll stand shown in FIGS. 1 and 2.
Figure 3A:
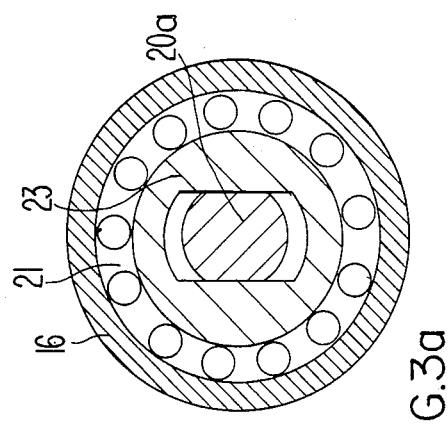
FIG. 3a is a sectional view along line A—A in FIG. 3.

Reference will now be made to FIGS. 3 and 3a in order to describe in greater detail the upper supporting roll 8.

The fixed internal support 15 has two stub shafts 19 for mounting the supporting roller in the support 2 of the roll stand, together with two bearing surfaces 20 and a cylindrical body 22. The tubular casing 16 is mounted for rotation on the bearing surfaces 20 with the aid of roller bearings 21 and of an intermediate member 23 provided with a central opening, inside which is engaged the part 20 of the support 15. The member 23 is mounted on the bearing surface 20 in such a manner as to permit a certain movement of this member 23, of the bearing 21, and of the casing 16 in the vertical direction relative to the fixed support 15. The mounting of the roll 8 is identical at both ends.

The body 22 of the fixed support 15 has pierced in it five cavities 24, each of which constitutes the chamber of one of the jacks 14.

The chambers 24 of the jacks 14 are each supplied independently with pressurized oil via an axial duct 27.

These ducts 27 lead to the end of the stub shaft 19b, where five lines, each supplying a duct 27, are fixed.

Each of the pistons 25 has a rod mounted sealingly, with the aid of seals 26, and for movement in the radial direction inside the corresponding chamber 24. At their ends situated towards the inside surface of the tubular casing 8, the pistons have a widened portion forming two chambers, which are brought into communication with the chamber 24 by way of two ducts of very small diameter which pass through the rod of the piston 25.

In this way, when the chamber 24 is supplied with pressurized oil, the piston is displaced radially and a small part of the oil penetrates through the ducts in the piston 25 into the chambers situated near the inside surface of the annular casing 16. In this way, a film of pressurized oil is formed between the end of the jack 25 and the inside surface of the casing 8. The thrust of the jacks 14 can be applied to the casing 16, which nevertheless remains rotationally movable about the fixed support 15 with the aid of the fluid bearings constituted by the end chambers of the pistons 25 of the jacks 14.

The action of the jacks 14 makes it possible to adjust the shape and the position of the generatrix of contact 18 between the supporting roll 8 and the work roll 5. The adjustment of the position and of the shape of this generatrix of contact 18 in turn makes it possible to adjust the position and the shape of the generatrix of contact of the work roll with the sheet being rolled, and therefore the profile and thickness of this sheet.

Figure 5:
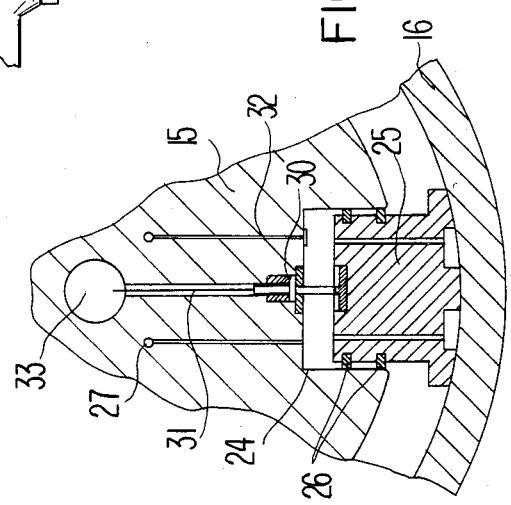
FIG. 5 is a partial view in section through a transverse plane of the variable camber roll, showing the devices for measuring the pressure and position of the piston.

In FIG. 5 can be seen the lower part of the roll 8 in the proximity of a jack 14, whose chamber 24 is supplied with pressurized fluid by way of a duct 27. A pressure measuring line 32 also leads into the chamber 24, this line being connected to a pressure sensor disposed in the chamber 24 and passing out of the roll 8 at its end 19b, like the pressurized fluid supply ducts 27.

The piston 25 of the jack is connected to the rod of a position sensor 30 located in the axis of the jack 14. A measuring line 31 connected to the position sensor 30 leads into an axial duct 33 machined in the support 15 of the roll 8. The position measurement signals are transmitted to the interior of the duct 33 by measuring lines 31 at one end of the support 15 of the roll 8.

Figure 4:
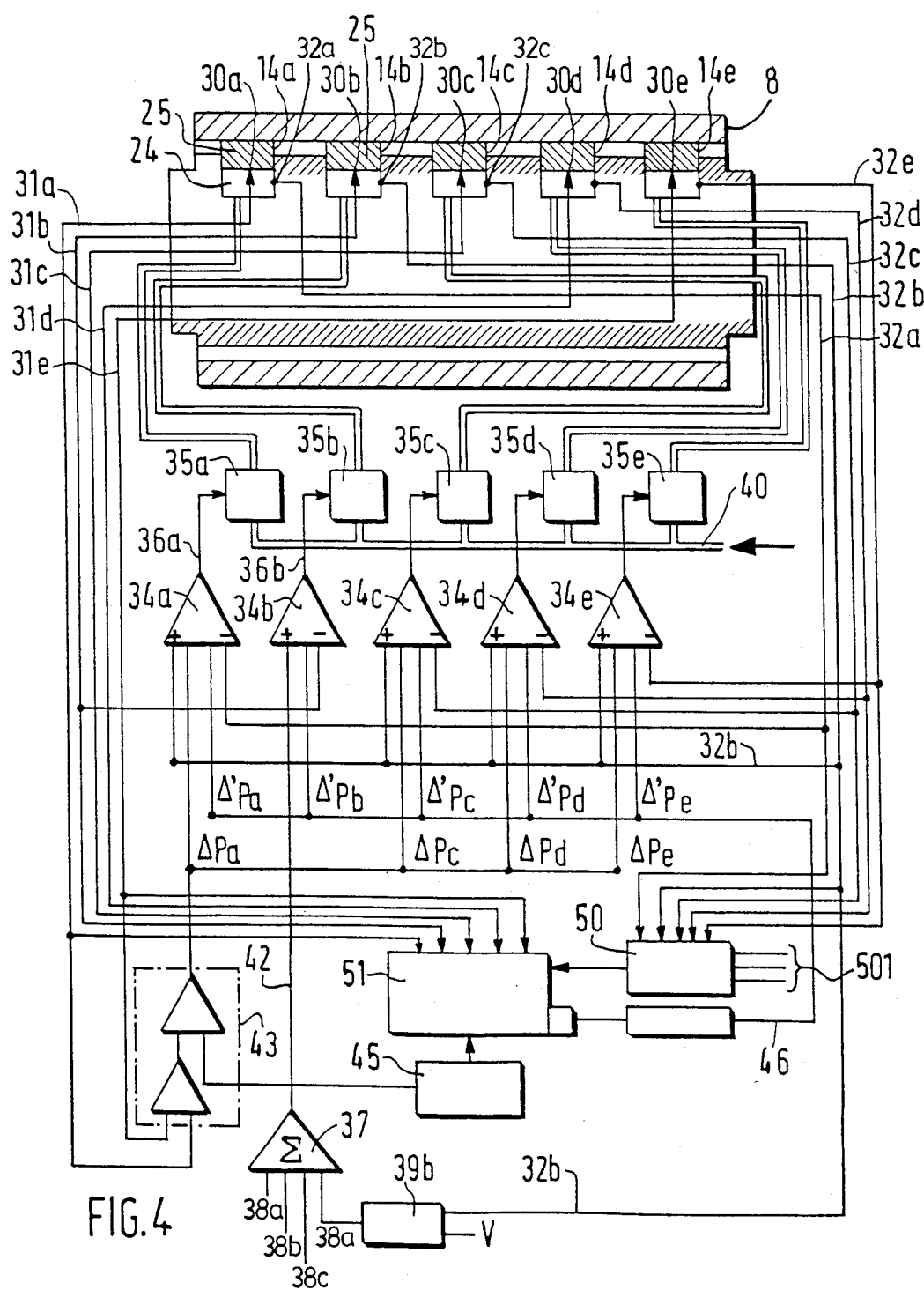
FIG. 4 shows diagrammatically the control and adjustment assembly of the roll stand shown in FIGS. 1 and 2.

FIG. 4 shows the assembly comprising control elements making it possible to adjust the shape and position of the generatrix 18 and therefore the profile and thickness of the sheet 1.

FIG. 4 shows very diagrammatically the five jacks 14a, 14b, 14c, 14d and 14e of the supporting roll 8. As described above with reference to FIG. 5, each of these jacks has associated with it a pressure sensor making it possible to know continuously the pressure in the chamber 24 of the jack, and a position sensor placed in the central part of the piston 25 of the jack and making it possible to determine extremely accurately the position of the piston of the jack at every moment. The signal representing the position of the jack piston is taken from the position sensor 30 by the measuring line 31. The pressure measurement is transmitted by the measuring line 32 to a regulator 34, which transmits the pressure set point via a line 36 to a servo valve 35 permitting the feeding of the jack at the desired pressure, the servo valve 35 being interposed between the supply duct 40 of the jack and the chamber of the latter.

Each of the jacks 14 therefore has a pressure regulation loop for its continuous adjustment during the operation of the rolling mill.

In reality the jacks do not undergo pressure adjustment through a set point supplied, for example, by a thickness measurement, as in devices of the prior art, the disadvantages of which have been pointed out.

The jacks 14a, 14c, 14d, and 14e have a pressure regulation loop as just described above, whereas the jack 14b is adjusted in respect of position in accordance with the readings of the thickness gauge 10. This gauge 10 is disposed transversely in relation to the strip, in a position equivalent to the position of the jack 14b.

For the adjustment of the position of the rod of this jack 14b, the regulator 34b receives a position signal via a line 42, which signal is compared with a signal representing the measurement of the position of the jack rod and transmitted through the measuring line 31.

The resulting signal makes it possible to control the servovalve 35b for the feeding of the jack, which is thus adjusted in position.

The regulation signal transmitted by the line 42 originates from a regulator 37 receiving as input the signal from the thickness gauge 38a, the thickness reference 38b, a signal representing the yielding of the roll stand 38c, and a signal representing the thickness of the oil film 38d. The signal representing the oil film thickness 38d is processed in a computer unit 39b receiving as input the speed of rotation of the roll 8, which is measured continuously, and the signal representing the pressure in the jack 14b, which is taken from the measuring line 32b.

All the data supplied to the regulator 37 make it possible to determine the position of the piston of the jack 14b in order to comply with the thickness set point with very great accuracy, namely to within one micron.

The signal representing the pressure in the jack 14b is transmitted via the measuring line 32b to each of the regulators 34a, 34c, 34d, and 34e as set point.

The jacks 14a, 14c, 14d, and 14e are therefore controlled by the pressure of the jack 14b, which is itself adjusted in respect of position.

This results in good stability of the adjustment of these jacks.

The signals representing the positions of the pistons of the jacks 14a and 14e are transmitted via the measuring lines 31a and 31e to a digital regulator 43, which makes it possible to obtain a signal representing the difference between these two position signals, and this difference is in turn compared with a reference produced by the computer unit 45 of the flatness measuring device.

This signal representing the difference between the position signals of the end jacks represents the transverse tilt of the casing of the supporting roll 8, i.e., the inclination of the generatrix 18 relative to the horizontal.

The reference signal transmitted via a measuring line 44 to the regulator 43 corresponds to the desirable value of the rocking of the supporting roll 8 for the correction of the differences of tension between the two edges of the sheet. These tensions are measured by the flatness measuring device, whose computer unit makes it possible to determine the correction of the tilt in accordance with the difference in tension.

The output signal of the regulator 43 is in the form of a complex signal representing corrections of pressure $\Delta Pa$, $\Delta Pc$, $\Delta Pd$, and $\Delta Pe$ of the corresponding jacks, in order to obtain the correction of the tilt. The signals representing these corrections of pressure are transmitted to the corresponding regulators 34a, 34c, 34d, and 34e.

The signals representing the pressures Pa, Pb, Pc, Pd, and Pe in the different jacks are taken from the measuring lines 32 and are transmitted to a computer unit 50, which also receives as input data the data relating to the dimensional and mechanical characteristics of the fixed support 15 of the supporting roll 8.

The computer unit 50 produces a group of signals representing the flexion of the fixed support 15 at each of the jacks. The calculations of deformation of the fixed support can be made if the mechanical and dimensional characteristics of the support and the forces applied by the different jacks, proportional to the pressures of the fluid in these jacks, are known.

The signals representing the flexions of the fixed support and the signals representing the positions of the pistons of the different jacks are transmitted to a computer and regulation unit 51 constituting a digital regulator which makes it possible to determine the absolute positions of the pistons of the jacks, of the casing 15 of the roll 8, and of the generatrix of contact. The computer unit 51 therefore makes it possible to determine extremely accurately the exact shape of the generatrix of contact 18 of the supporting roll.

The values of the tension in the strip, measured by the flatness measuring device 45, are transmitted to the computer unit 51, which determines the reference camber of the roll 8 required for the correction of flatness in the light of the readings of the device 45. The curve of the camber measured, corresponding to the shape of the generatrix of contact 18, and the reference camber are compared in the computer unit 51, which produces signals representing the pressure corrections $\Delta'Pa$, $\Delta'Pb$, $\Delta'Pc$, $\Delta'Pd$, and $\Delta'Pe$ to be applied to the different jacks in order to bring the camber back to its reference shape.

The signals representing pressure corrections are transmitted by a line 46 to the corresponding regulators 34.

The precise determination of the position of the supporting roll casing and of its generatrix of contact makes it necessary for the computer unit 51 to take into account the calculations of thickness of the oil film obtained in the computer units 39.

There is thus continuously obtained an extremely accurate measurement of the shape of the generatrix which can be brought to a shape corresponding to that required for the flatness correction.

The principal advantages of the process according to the invention are therefore that it permits adjustment of thickness with very great accuracy, of the order of 1% of the nominal thickness, constantly controlled flatness because of the control of the shape of the generatrix of contact between the supporting roll and the work roll, and very great stability of operation.

It is possible to measure the flatness of the strip by any method that is sufficiently sensitive and accurate.

Similarly, it is possible to select a thickness gauge of any type which enables adequate accuracy to be ensured.

It is even possible to make the adjustment of thickness and profile of the sheet without using a thickness gauge and a flatness roller, for example when such gauge or flatness roller is temporarily unavailable as the result of a breakdown or damage. For this purpose, an operator intervenes from the control desk of the rolling mill to introduce a thickness reference value into the position adjustment loop of the jack whose position is controlled, a reference value for the inclination of the generatrix of contact, and a reference shape for this generatrix, selected in accordance with the profile corrections which are to be made, into the corresponding correction loops for the pressure of the jacks.

The arrangement of the position and pressure sensors on the different jacks may be different from that described.

In a general way, the process according to the invention may utilize measurement, computing, or regulation means already in use in the rolling mills of the prior art, for example for the determination of the thickness of the sheet, the yielding of the roll stand, or the position of the jack pistons. In certain cases it is possible to effect the adjustment of thickness and flatness without taking into account the variations of the thickness of the film of pressurized liquid.

This film may in fact have a constant thickness whatever the pressure of the fluid and the speed of rotation of the roll, if its behavior remains hydrostatic. In this case, no calculation will be made of the thickness of the film of fluid, introducing a variable amplitude correction into the calculation of the position of the jack whose position is controlled and into the determination of the shape of the generatrix of contact.

Similarly, in certain cases, depending on the rigidity of the stand and the accuracy required in respect of the thickness of the sheet, it is not necessary to determine the yielding of the roll stand for the purpose of adjusting the position of the jack selected in order to effect the adjustment of thickness.

Figure 6:
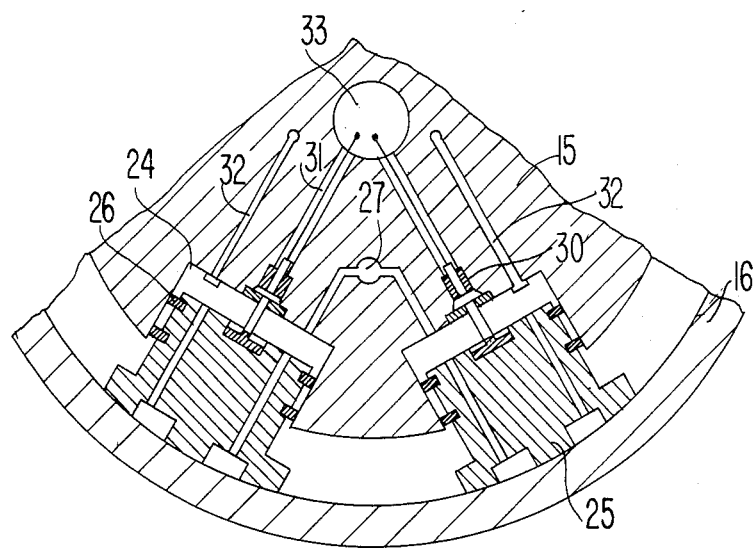
FIG. 6 is a view similar to FIG. 5, showing a variant in which two jacks are so disposed as to form an acute angle.

In cases where the rolling forces are considerable, use will be made of a plurality of axially spaced arrangements of two jacks, whose chambers and pistons, directed radially relative to the roller, are disposed in such a manner as to form an acute angle α, as shown in FIG. 6. These arrangements of two jacks are each equivalent to a single jack, the position of whose piston at any moment can be determined from the positions of the pistons of the two jacks disposed angularly and from the angle α formed by these two jacks.

A calculation of the position of the piston of the jack equivalent to each arrangement of two jacks will thus be made continuously. This calculated value of the position of the equivalent jack will be used, instead of the value of the position of the pistons of the jacks 14 in the example described above, for all the stages of the process where this value of the position of the jacks is used.

The process according to the invention can be applied to stands having either one or more variable camber rolls of the type described, or to a plurality of successive stands in a multi-stand rolling mill, or only to the final stand of such rolling mill.

Finally, the process according to the invention is applicable to the rolling of all metal sheets or strips of ferrous or non-ferrous materials.

What is claimed is:

1. A process of rolling flat product comprising the following steps:
   (a) providing a roll stand comprising at least one roll (8) consisting of a fixed support (15) bearing on a frame (2) of said roll stand and a tubular casing (16) in contact with said flat product (1) and/or with another roll, along a generatrix of contact (18), and mounted for rotation about said fixed support, the inside diameter of said casing being such that a space is formed between said support and said casing, said fixed support being provided with at least three jacks (14) spaced apart in the axial direction of said roll, corresponding to the transverse direction of said flat product, each jack comprising a chamber (24) fastened to said fixed support and a radially directed piston (25) constituting, at its end directed towards the inner surface of said casing (16), at least one chamber, said chamber of each jack being connected through a duct (27) and a control valve to a source of pressurized fluid, each of said control valves being connected to only one of said jacks, and means being provided for sensing the pressure in said chamber of each of said jacks;
   (b) rotating said casing (16), an oil film being formed between said casing and each of said pistons;
   (c) passing said flat product (1) through said roll stand and reducing its thickness;
   (d) measuring the position of the piston of said one jack in relation to said support (15);
   (e) measuring the thickness of said flat product (1) in a zone situated downstream of said roll stand and closer, in the transverse sense, to said one jack than to any other of said jacks, and comparing the measured thickness in said zone to the desired thickness of said flat product;
   (f) setting a desired value of the position of the piston of said one jack in relation to the result of the comparison of said measured thickness and said desired thickness;
   (g) controlling said control valve relative to said one jack for obtaining and maintaining said desired value of the position of the piston of said one jack;
   (h) setting a desired pressure value in each of said other jacks in relation to the sensed value of the pressure in said one jack; and
   (i) controlling said control valves of each of said other jacks for obtaining and maintaining said desired pressure.

2. A process according to claim 1, comprising the further steps of:
   (j) measuring the flatness of said flat product in the transverse direction;
   (k) calculating the deformation of said fixed support from the pressures measured in each of said jacks and the mechanical and dimensional characteristics of said fixed support;
   (l) measuring the position of the piston of all the jacks other than said one jack;
   (m) determining the shape of the generatrix of contact of said roll from the deformation of said fixed support and the position of said pistons of all said jacks of said fixed support; and
   (n) modifying the pressure in said jacks in order to cause the shape of said generatrix of contact to coincide with a reference shape determined from the transverse flatness measurement.

3. A process according to claim 2, comprising the further steps of:

(o) measuring the position of the piston of the two jacks situated in end transverse position;

(p) comparing the position of said two jacks in order to determine the tilt of said roll; and (q) modifying the pressure in said two jacks so as to bring the tilt to a reference value determined by the transverse flatness measurement.

4. A process according to claim 2, further comprising the steps of:

(o) measuring the speed of rotation of said tubular casing;

(p) calculating the thickness of the film of pressurized fluid between each of said pistons of said jacks and said casing of said roll depending on the speed of rotation of said roll and the pressure of the fluid in the corresponding jack; and (q) controlling the position of the piston of said one jack and determining the shape of the generatrix of contact of said roll as a function of this calculated value of the thickness of the film of fluid.

5. A process according to claim 6, further comprising the steps of:

(j) calculating the yielding of said roll stand containing said roll; and (k) controlling the position of said one jack as a function of this calculated value of the yielding of said roll stand.

6. A process of rolling a flat product comprising the following steps:

(a) providing a roll stand comprising at least one roll (8) consisting of a fixed support (15) bearing on a frame (2) of said roll stand and a tubular casing (16) in contact with said flat product (1) and/or with another roll, along a generatrix of contact (18), and mounted for rotation about said fixed support, the inside diameter of said casing being such that a space is formed between said support and said casing, said fixed support being provided with at least three jacks (14) spaced apart in the axial direction of said roll, corresponding to the transverse direction of said flat product, each jack comprising a chamber (24) fastened to said fixed support and a radially directed piston (25) constituting, at its end directed towards the inner surface of said casing (16), at least one chamber, said chamber of each jack being connected through a duct (27) and a control valve to a source of pressurized fluid, each of said control valves being connected to only one of said jacks, and means being provided for sensing the pressure in said chamber of each of said jacks;

(b) rotating said casing (16), an oil film being formed between said casing and each of said pistons;

(c) passing said flat product (1) through said roll stand and reducing its thickness;

(d) measuring the position of the piston of said one jack in relation to said support (15);

(e) introducing manually a reference value for the position of the piston of said one jack;

(f) controlling said control valve relative to said one jack for obtaining and maintaining a desired value of the position of the piston of said one jack;

(g) setting a desired pressure value in each of said other jacks in correspondence to the sensed values of the pressure in said one jack;

(h) controlling said control values of each of said other jacks for obtaining and maintaining said desired pressure value;

(i) measuring the position of the piston of all the jacks other than said one jack;

(j) determining the shape of the generatrix of contact of said roll from the deformation of said fixed support and the position of said pistons of all of said jacks of said fixed support;

(k) measuring the position of the two jacks situated in end transverse position;

(l) comparing the position of said two jacks in order to determine the tilt of said roll;

(m) introducing manually an inclination and a shape of the generatrix of contact selected by an operator; and (n) modifying the pressure in said other jacks to cause the measured inclination and shape of said generatrix of contact to coincide with said selected inclination and shape.

7. A process as claimed in claim 1 or 6, in cases where, in order to balance considerable rolling forces, said casing is supported by at least three axially spaced arrangements of two jacks whose chambers and radially directed pistons form an acute angle $\alpha$, including the step of calculating the position of a single jack equivalent to the two jacks, for each of the arrangements of two jacks from the positions of the pistons of the jacks and from the angle $\alpha$, and using this position of the piston of an equivalent jack to replace the position of the pistons of said jacks, the two jacks of each arrangement being constantly supplied with fluid at the same pressure.

8. Apparatus for adjusting the thickness and profile of a flat product during rolling, comprising (a) a roll stand comprising at least one roll (8) consisting of a fixed support (15) bearing on a frame (2) of said roll stand and a tubular casing (16) in contact with said flat product (1) and/or with another roll, along a generatrix of contact (18), and mounted for rotation about said fixed support, the inside diameter of said casing being such that a space is formed between said support and said casing, said fixed support being provided with at least three jacks (14) spaced apart in the axial direction of said roll, corresponding to the transverse direction of said flat product, each jack comprising a chamber (24) fastened to said fixed support and a radially directed piston (25) constituting, at its end directed towards the inner surface of said casing (16), at least one chamber, said chamber of each jack being connected through a duct (27) and a control valve to a source of pressurized fluid, each of said control valves being connected to only one of said jacks, and means being provided for sensing the pressure in said chamber of each of said jacks;

(b) means for rotating said casing (16), an oil film being formed between said casing and each of said pistons;

(c) means for passing said flat product (1) through said roll stand and reducing its thickness;

(d) means for measuring the position of the piston of said one jack in relation to said support (15);

(e) means for measuring the thickness of said flat product (1) in a zone situated downstream of said roll stand and closer, in the transverse sense, to said one jack than to any other of said jacks, and for comparing the measured thickness in said zone to the desired thickness of said flat product;

(f) means for setting a desired value of the position of the piston of said one jack in relation to the result of the comparison of said measured thickness and said desired thickness;

(g) means for controlling said control valve relative to said one jack for obtaining and maintaining said desired value of the position of the piston of said one jack;

(h) means for setting a desired pressure value in each of said other jacks in relation to the sensed value of the pressure in said one jack; and (i) means controlling said control valves of each of said other jacks for obtaining and maintaining said desired pressure.

* * * * *